(12) United States Patent
Sadanandan et al.

(10) Patent No.: US 10,560,408 B2
(45) Date of Patent: Feb. 11, 2020

(54) COMPUTERIZED SYSTEM AND METHOD FOR SELECTIVELY COMMUNICATING HTML CONTENT TO A USER'S INBOX AS A NATIVE MESSAGE

(71) Applicant: OATH INC., New York, NY (US)

(72) Inventors: Suhas Sadanandan, Pleasanton, CA (US); Utkarsh Shrivastava, San Jose, CA (US); Kanika Shah, Sunnyvale, CA (US); Kevin Day, San Jose, CA (US); Yaqi Hu, Milpitas, CA (US); David LeRoy, Sunnyvale, CA (US); Ramachandran Ramaswamy, San Jose, CA (US)

(73) Assignee: OATH INC., New York, NY (US)

( * ) Notice: Subject to any disclaimer, the term of this patent is extended or adjusted under 35 U.S.C. 154(b) by 139 days.

(21) Appl. No.: 14/699,378

(22) Filed: Apr. 29, 2015

(65) Prior Publication Data

US 2016/0323218 A1 Nov. 3, 2016

(51) Int. Cl.
 *H04L 12/58* (2006.01)
(52) U.S. Cl.
 CPC .................. *H04L 51/10* (2013.01)
(58) Field of Classification Search
 CPC ....... H04L 41/026; H04L 51/08; H04L 51/10; H04L 51/36; H04L 67/306
 USPC .......................................................... 709/206
 See application file for complete search history.

(56) References Cited

U.S. PATENT DOCUMENTS

| 6,965,926 B1 * | 11/2005 | Shapiro ............. G06F 17/30876 707/E17.112 |
| 7,047,212 B1 * | 5/2006 | Pych ...................... G06Q 30/02 705/27.1 |
| 9,369,333 B1 * | 6/2016 | Chiu ..................... H04L 41/026 |
| 9,654,426 B2 | 5/2017 | Underwood, IV et al. |

(Continued)

FOREIGN PATENT DOCUMENTS

WO 2014081863 A1 5/2014

OTHER PUBLICATIONS

TutorialsPoint, "E-mail Protocols," Sep. 2014, tutorialspoint.com, www.tutorialspoint.com/internet_technologies/e_mail_protocols.htm.*

(Continued)

*Primary Examiner* — Ruolei Zong
(74) *Attorney, Agent, or Firm* — James J. DeCarlo; Greenberg Traurig, LLP

(57) ABSTRACT

Disclosed are systems and methods for improving interactions between servers in a messaging system supported by or configured with content providing servers or platforms. The disclosed systems interact to filter data across platforms, which data can be used to improve the contextual quality of data used in processing interactions between or among processors in such systems. The disclosed computer systems and methods enable the communication of contextually relevant Hypertext Markup Language (HTML) content to a user's inbox. Such messages are native to a communication platform, application or service associated with the user's inbox. Such messages can be selected for delivery to a user based on the user's profile data, behavioral information, a user's geographic location, demographic information, a time period, and the like.

20 Claims, 8 Drawing Sheets

(56) References Cited

U.S. PATENT DOCUMENTS

| | | | |
|---|---|---|---|
| 2001/0037315 A1* | 11/2001 | Saliba | G06Q 10/107 |
| | | | 705/70 |
| 2002/0138581 A1* | 9/2002 | MacIntosh | G06Q 10/107 |
| | | | 709/206 |
| 2005/0165896 A1 | 7/2005 | Mooney | |
| 2007/0180039 A1 | 8/2007 | Sutidze et al. | |
| 2008/0168347 A1* | 7/2008 | Hallyn | G06Q 10/107 |
| | | | 715/700 |
| 2009/0177745 A1* | 7/2009 | Davis | G06Q 10/107 |
| | | | 709/204 |
| 2012/0047014 A1 | 2/2012 | Smadja et al. | |
| 2013/0097251 A1 | 4/2013 | Stibel et al. | |
| 2013/0191208 A1* | 7/2013 | Chourey | G06Q 30/0201 |
| | | | 705/14.45 |
| 2015/0100645 A1* | 4/2015 | Steinmann | H04L 51/34 |
| | | | 709/206 |
| 2016/0063565 A1* | 3/2016 | Srivastava | G06Q 30/0269 |
| | | | 705/14.66 |

OTHER PUBLICATIONS

International Search Report and Written Opinion to corresponding International Application No. PCT/US2016/027212 dated Jul. 13, 2016 (6 pages).

* cited by examiner

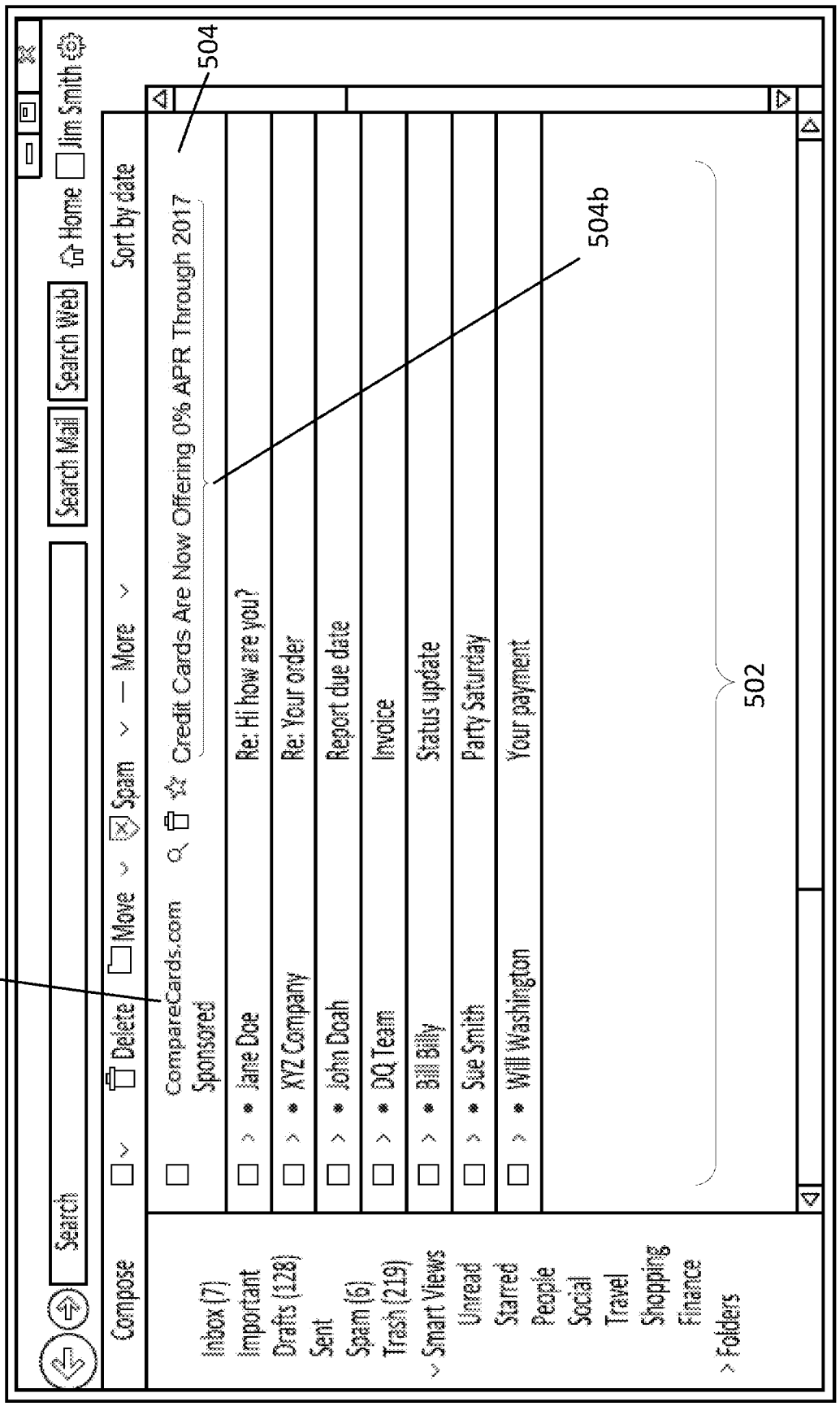

COMPUTERIZED SYSTEM AND METHOD FOR SELECTIVELY COMMUNICATING HTML CONTENT TO A USER'S INBOX AS A NATIVE MESSAGE

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of server systems and/or platforms programmed to work in concert with content delivery systems to communicate relevant, rich Hypertext Markup Language (HTML) content to a user inbox on a communication platform as a native messages to such platform.

SUMMARY

The present disclosure describes computer systems and methods for delivering HTML content to a user's inbox within a dedicated, native message. The disclosed systems and methods can leverage derived, identified, determined and/or otherwise known user information to select rich, relevant third party provided HTML content for delivery to a user's inbox within a native message to the inbox platform. According to embodiments of the present disclosure, such messages are native to a communication platform, application, web-based system, or service hosting and/or associated with the user's inbox.

Thus, the disclosed systems and methods enable the delivery of rich relevant, and/or promotional HTML content to a user's inbox within native messages to such inbox. This enables the increase of valuable impressions of online media, which frees up user-interface (e.g., real-estate) in the user inbox to be used in a manner that will increase monetization through higher click-through-rates (CTRs) and increased return-on-investment (ROI), revenues, salience and relevance of served content/online media.

In accordance with one or more embodiments, a method is disclosed which includes receiving, at a computing device associated with a messaging platform, Hypertext Markup Language (HTML) content and delivery criteria information from a third party, the delivery criteria information comprising at least one condition for having the HTML content sent to a user via the messaging platform; storing, via the computing device, the HTML content and delivery criteria information in a database in communication with the messaging platform; identifying, via the computing device, a user having a messaging account with the messaging platform based on the delivery criteria information; creating, via the computing device, a message addressed to an inbox of the identified user, the message comprising the HTML content, the message being native to the messaging account; and communicating, via the computing device and over a network, the native message to the inbox of the identified user.

According to some embodiments of the present disclosure, the HTML content comprises rich, interactive HTML content that is formatted with multiple network destinations set by the third party, where the formatting comprises embedding a Uniform Resource Locator (URL) for each network destination in the HTML content.

In accordance with one or more embodiments, a non-transitory computer-readable storage medium is provided, the computer-readable storage medium tangibly storing thereon, or having tangibly encoded thereon, computer readable instructions that when executed cause at least one processor to perform a method for communicating rich HTML content to a user inbox on a communication platform via native messages to such platform.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIGS. 5A-5C illustrate non-limiting examples in accordance with some embodiments of the present disclosure.

DESCRIPTION OF EMBODIMENTS

Figure 1:
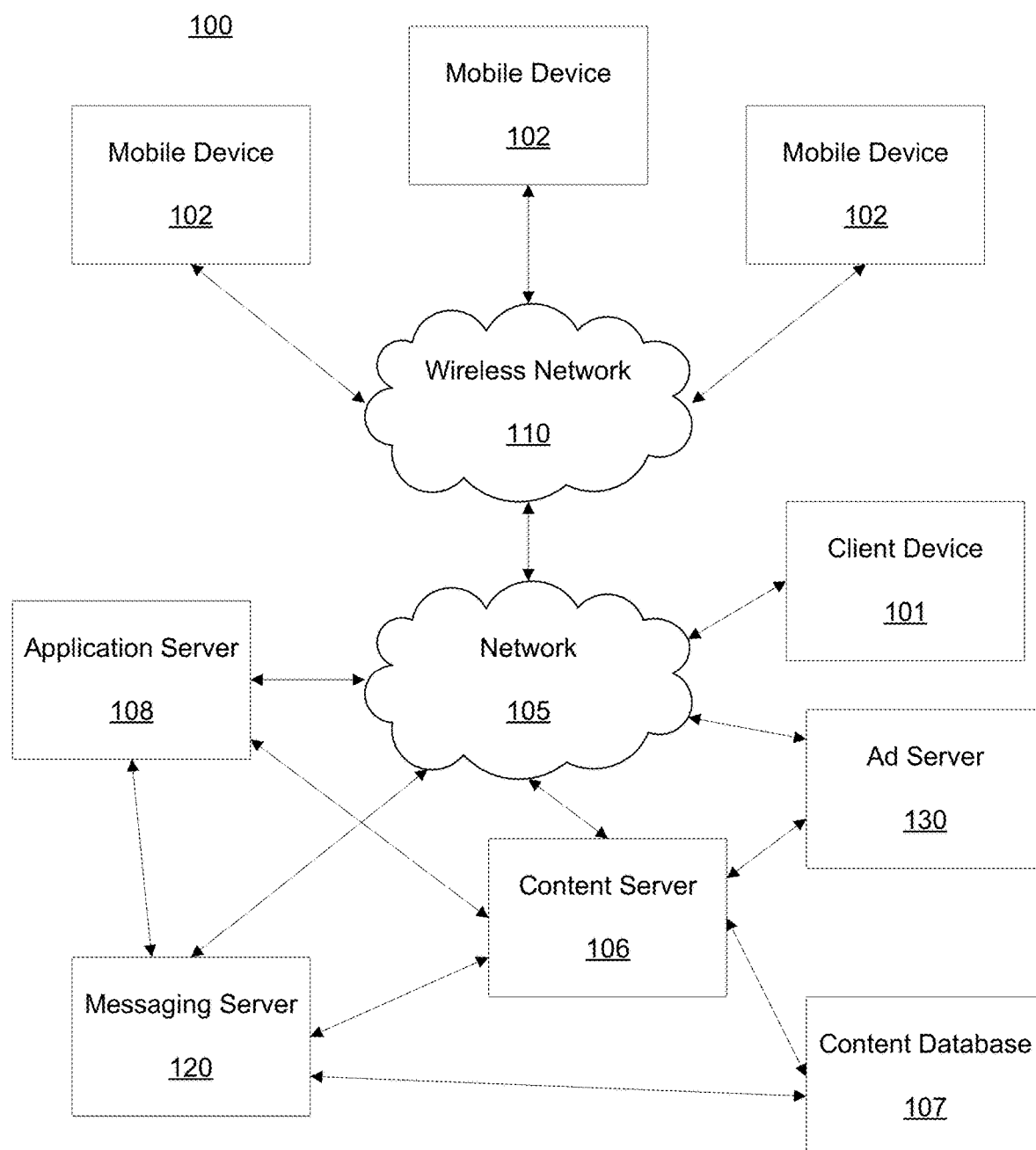
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer to alter its function, a special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a smart phone, phablet or tablet may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows®, iOS® or Linux®, or a mobile operating system, such as iOS, Android®, or Windows® Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. By way of background, marketing of products and services is ubiquitous across all Internet platforms. Internet advertising via ad servers has proven to be an effective and lucrative source of revenue. Advertising on the Internet provides the possibility of allowing advertisers to cost-effectively reach highly specific target audiences—as opposed to traditional broadcast and print advertising media that reach only broadly definable target audiences (e.g. television viewers in the greater New York area).

Conventional ad systems focus on serving advertisement content to users through targeting and/or retargeting marketing tools. Such conventional systems are only able to send advertisement content as static image content, which provides advertisers and/or email marketers minimal flexibility. That is, a conventional ad system is only able to communicate to users static advertisements as text, an image or a video, with a single link to other content. In order for such systems to provide other types of content, the static ad content must undergo various conversion processes, which is inefficient and leads to increased costs for the advertiser and email marketer.

The present disclosure remedies the shortcomings in the art by enabling dynamic, efficient and streamlined ad content communication to users. That is, the disclosed systems and methods enable the delivery of rich HTML content to a user's inbox within a dedicated, native message. The disclosed systems and methods can leverage derived, identified, determined and/or otherwise known user information to a messaging platform to select rich, relevant, third party provided HTML content for delivery to a user's inbox within a native message to the inbox platform.

Thus, according to embodiments of the present disclosure, the disclosed systems and methods can communicate (e.g., serve) rich promotional HTML content independently provided, hosted or otherwise made available by a third party to a user inbox associated with a communication platform via native messages to such platform. These messages can be treated in a similar manner as any other message received in the user's inbox (e.g., opened, marked as unread, saved, favorited, classified or categorized, and the like). Thus, the ad messages are displayed in a user's inbox and treated as typical messages users interact with regularly, as they are native messages, but rather than a static image or content item they comprise HTML ad content, as discussed in more detail below.

In some embodiments, such messages are delivered based on the content of such messages being identified as being of interest to the user, based on, for example, the user's profile data; and in some embodiments, messages are delivered according to criteria of an ad campaign or strategy associated with having particular content presented to particular users according to a variety of factors including, but not limited to, a user's geographic location, demographic information, a time period, and the like. However, in any such embodiment, or alternate embodiments discussed herein, the advertiser or entity generating the ad content is in most instances (although not necessary to the disclosed embodiments herein) unaware of the recipient user's identifying information. As discussed in more detail below in relation to FIGS. 3-5C, a mail platform, for example, accesses HTML ad content provided by a third party, matches a user to ad content, generates a native mail message comprising the HTML ad content, and delivers the message to the matched user.

According to some embodiments, content within messages delivered, sent or otherwise communicated to a user's inbox includes, among other types of content, rich, interactive HTML advertisement content, without limiting the scope of the disclosed systems and methods. Such HTML content can be associated with rich video, image and/or audio content, and can be formatted with links to multiple destinations (Uniform Resource Locators (URLs) and/or Uniform Resource Identifiers (URIs)) to external resources which may or may not be associated with the third party providing the HTML content. As such, for purposes of this disclosure, reference to content should be understood to include rich HTML content that is formatted with multiple destination links associated therewith; however, it should be understood that embodiments exist where the rich HTML content may embody one or more destination links associated therewith.

Figure 5B:
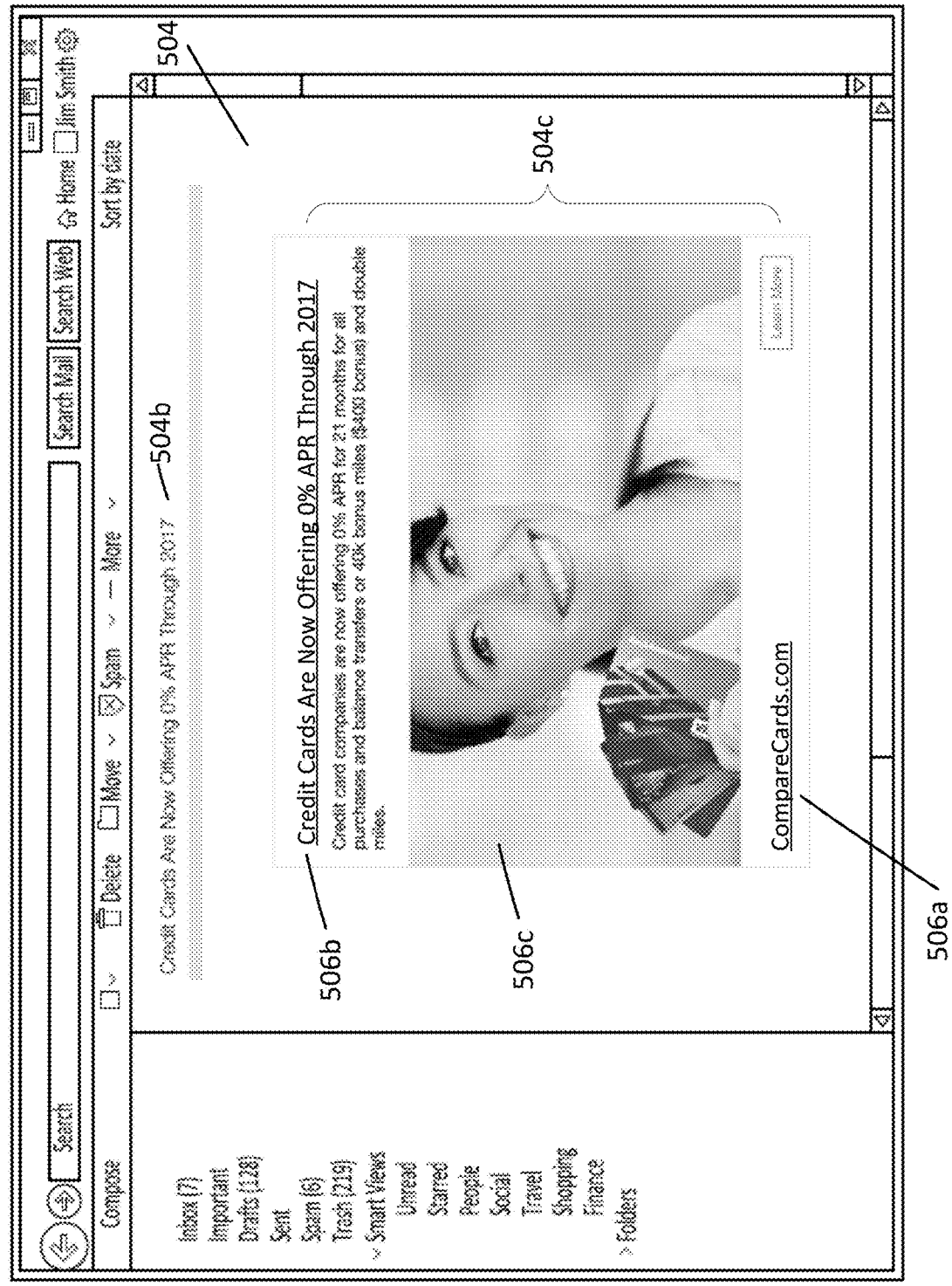
Figure 5C:
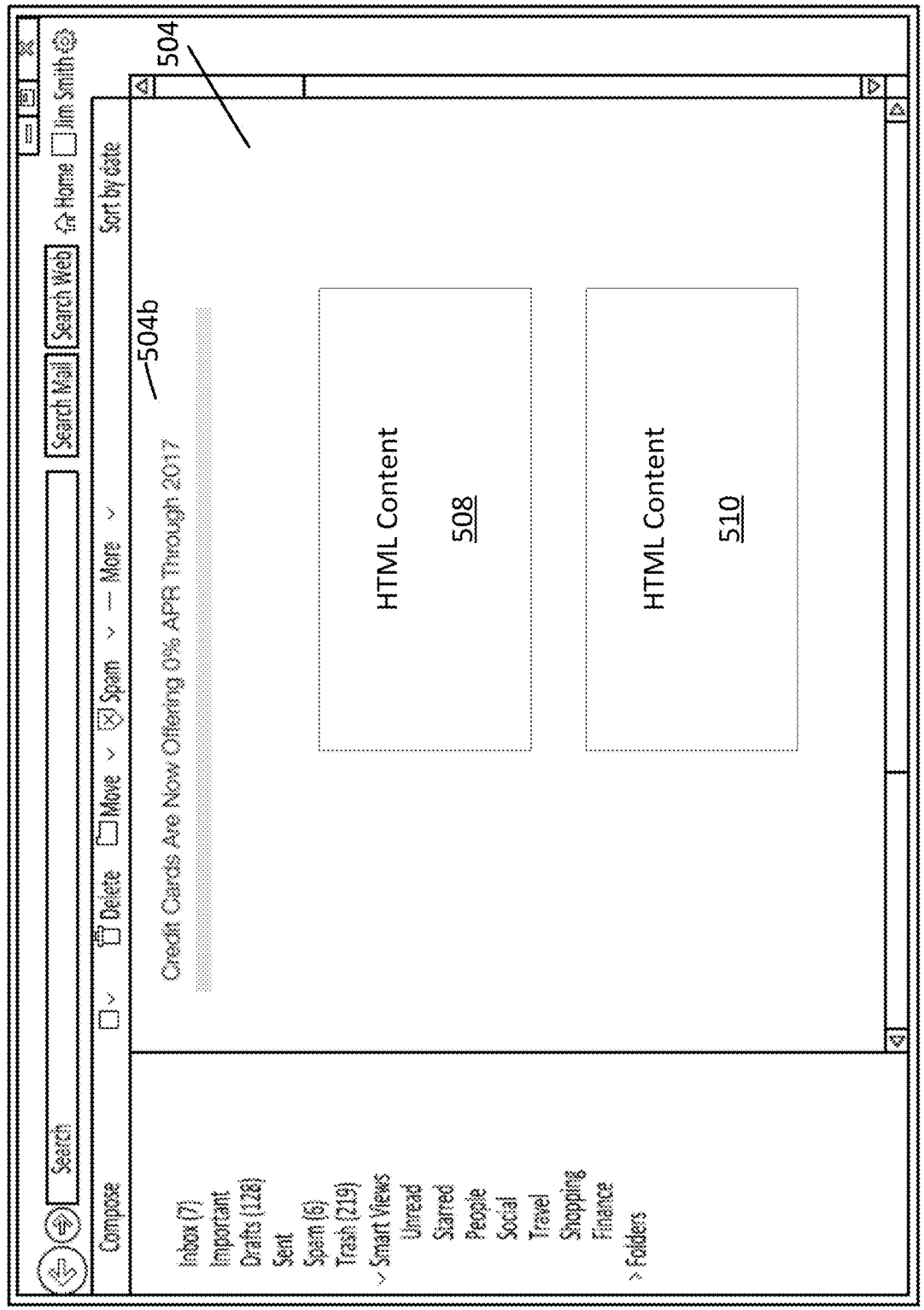

According to some embodiments, the HTML content in such messages is provided by an entity or a third party entity attempting to relay the HTML content as a type of promotional material. In some embodiments, such content can be derived, extracted, determined or otherwise identified from marketing information (e.g. marketing sheet) or ad provision criteria provided a third party. For example, the content can be an advertisement, in that the message being delivered to a user's inbox is a specifically dedicated message (e.g., email) that comprises the advertisement(s) (as illustrated in FIGS. 5A-5C, for example, and discussed in more detail below).

By way of a non-limiting example, user Bob has an account with Yahoo!® Mail. Bob is a 25 year old male living in New York, N.Y., and from Bob's user profile, it can be determined that Bob is a baseball fan. When the mail server/engine for Yahoo!® Mail performs an ad call, for example, a determination can be made that advertiser provided content, which is rich HTML content, matches Bob's interests. For example, the MLB® may be marketing merchandise for the teams in the playoffs, and upon the mail server/engine making the ad call, a determination is made matching Bob's interest in baseball to the promoted baseball merchandise the MLB® is promoting, thus satisfying the ad criteria. As such, the mail server selects the promoted HTML content (from an associated ad/content database/platform) and generates a Yahoo!® Mail message which includes such rich HTML content. This message, which is native to Yahoo!® Mail, is delivered to Bob's inbox as a separate email (in a similar manner as the example from FIG. 5A). Thus, Bob can open the message to view the rich, HTML content (in a similar manner illustrated in FIG. 5B; and/or as illustrated in FIG. 5C, Bob can view a plurality of rich, HTML content provided by the MLB®). Bob can also perform any other function available on the Yahoo!® Mail platform that can be performed on other email messages.

Indeed, the rich HTML content Bob is viewing can have associated therewith multiple destination links to, for example, locations to purchase the merchandise on the MLB® website; therefore, Bob is being provided a native email in his inbox that is not only comprised of rich HTML content, but also enables Bob direct access to multiple network locations associated with the promoted information being displayed to Bob.

Therefore, the disclosed systems and methods enable the delivery of relevant, promotional HTML content to a user's inbox within native messages to such inbox. This enables the increase of valuable impressions of online media, which frees up user-interface (e.g., real-estate) in the user inbox to be used in a manner that will increase monetization through higher click-through-rates (CTRs) and increased return-on-investment (ROI), revenues, salience and relevance of served content/online media. Thus, based on the present disclosure, available ad space can be used for showing different promotional information to the user thereby improving user experience and increasing monetization opportunities, in addition to freeing typical ad space up for other types of content to be displayed.

Websites, messaging applications and other platforms that host and/or serve advertisements are typically paid on a cost per impression basis (CPM), a cost per click (CPC), or cost per action accomplished (CPA), or under some other agreed upon billable event. Indeed, conventional systems are limited to displaying ad content as text, images, video and/or audio, or some combination thereof within a dedicated portion of a user interface (UI). However, the disclosed systems and methods for delivering advertisement content as native messages to a user's inbox enables advertisers (or third parties, marketers or content providers) to generate and customize HTML based advertisement messages, such as, for example, video ads and surrounding content in an email message, which can lead to increased user engagement thereby increasing CPM, CPC and/or CPA and the like. Therefore, through implementation of the disclosed systems and methods, sponsored advertisers can benefit from improved sales due to increased billable events being realized.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102 and client device 101. FIG. 1 additionally includes a variety of servers, such as content server 106, application (or "App") server 108, messaging server 120 and advertising ("ad") server 130.

One embodiment of mobile devices 102 is described in more detail below. Generally, however, mobile devices 102 may include virtually any portable computing device capable of receiving and sending a message over a network, such as network 105, wireless network 110, or the like. Mobile devices 102 may also be described generally as client devices that are configured to be portable. Thus, mobile devices 102 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102 may uniquely identify themselves through any of a variety of mechanisms, including a phone number, Mobile Identification Number (MIN), an electronic serial number (ESN), or other mobile device identifier.

In some embodiments, mobile devices 102 may also communicate with non-mobile client devices, such as client device 101, or the like. In one embodiment, such communications may include sending and/or receiving messages, share photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-102 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102 and its components with network 105. Wireless network 110 may include any of a variety of wireless sub-networks that may further overlay stand-alone ad-hoc networks, and the like, to provide an infrastructure-oriented connection for mobile devices 102. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly. Wireless network 110 may further employ a plurality of access technologies including 2nd (2G), 3rd (3G), and/or 4th (4G) generation radio access for cellular systems, WLAN, Wireless Router (WR) mesh, and the like. Access technologies such as 2G, 3G, 4G and future access networks may enable wide area coverage for mobile devices, such as mobile devices 102 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile device s 102 and another computing device, network, and the like.

Network 105 is configured to couple content server 106, application server 108, or the like, with other computing devices, including, client device 101, and through wireless network 110 to mobile devices 102. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between content servers 106, application server 108, client device 101, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within a social networking site. A social network refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, such as an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, email services, photo services, web services, third-party services, audio services, video services, instant messaging (IM) services, SMS services, MMS services, FTP services, voice over IP (VOIP) services, or the like. Such services, for example the email services and email platform, can be provided via the messaging server 120. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, email servers, social networking services servers, SMS servers, IM servers, MMS servers, exchange servers, photo-sharing services servers, and travel services servers, via the network 105 using their various devices 101-102. In some embodiments, applications, such as a messaging application (e.g., Yahoo! Messenger®, Yahoo! Mail®, and the like), can be hosted by the application server 108. Thus, the application server 108 can store various types of applications and application related information including application data and user profile information. In another example, messaging server 120 can host email applications; therefore, the messaging server 120 can store various types of applications and application related information including email application data and user profile information. It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
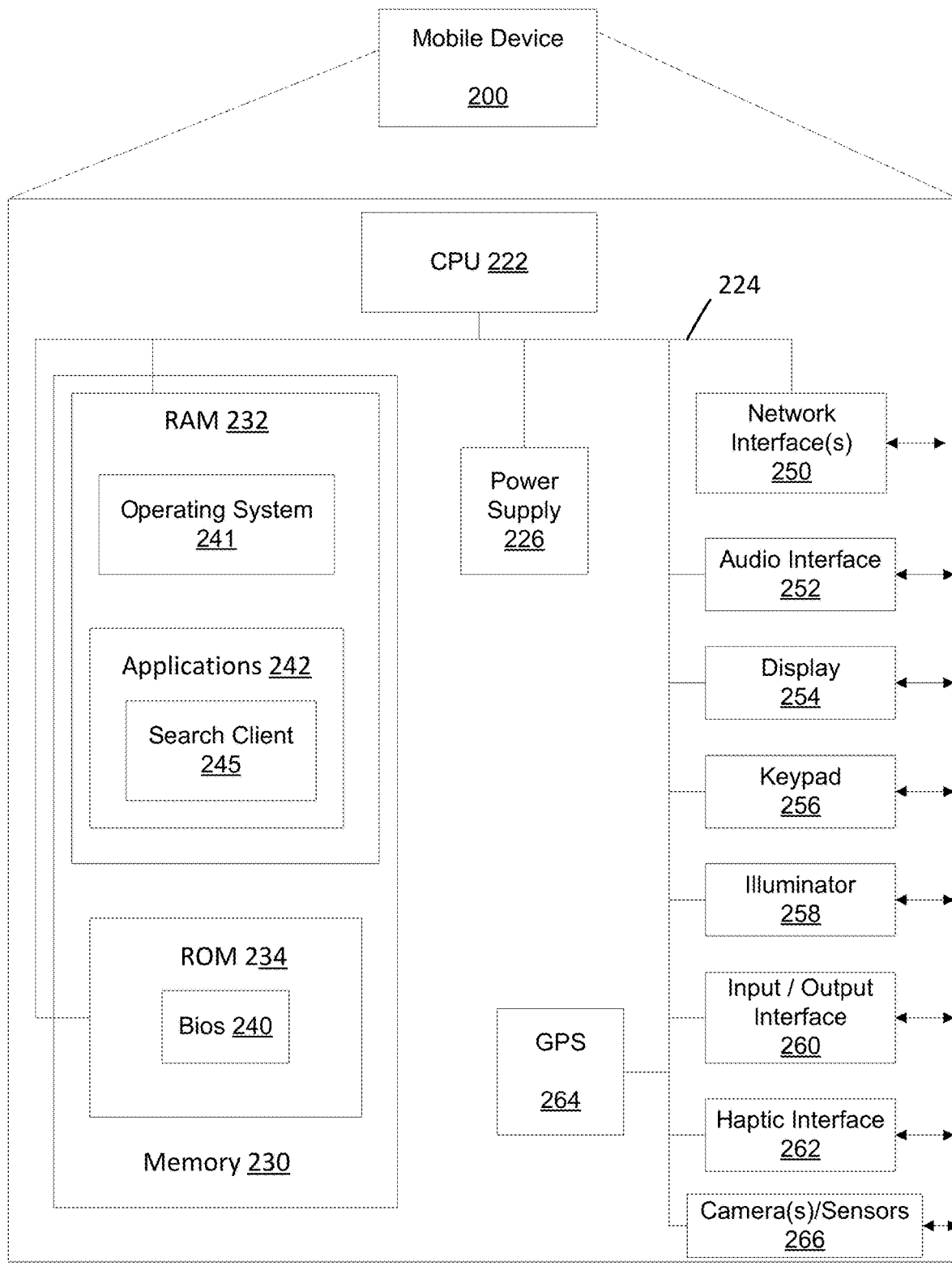
FIG. 2 depicts is a schematic diagram illustrating a client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical or electromagnetic sensors 266. Device 200 can include one camera 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies including, but not limited to, global system for Client communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 300.

Applications 242 may include computer executable instructions which, when executed by Client device 200, transmit, receive, and/or otherwise process audio, video, images, and enable telecommunication with another user of another client device. Other examples of application programs include calendars, browsers, contact managers, task managers, transcoders, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query messages, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and methods will now be described.

Figure 3:
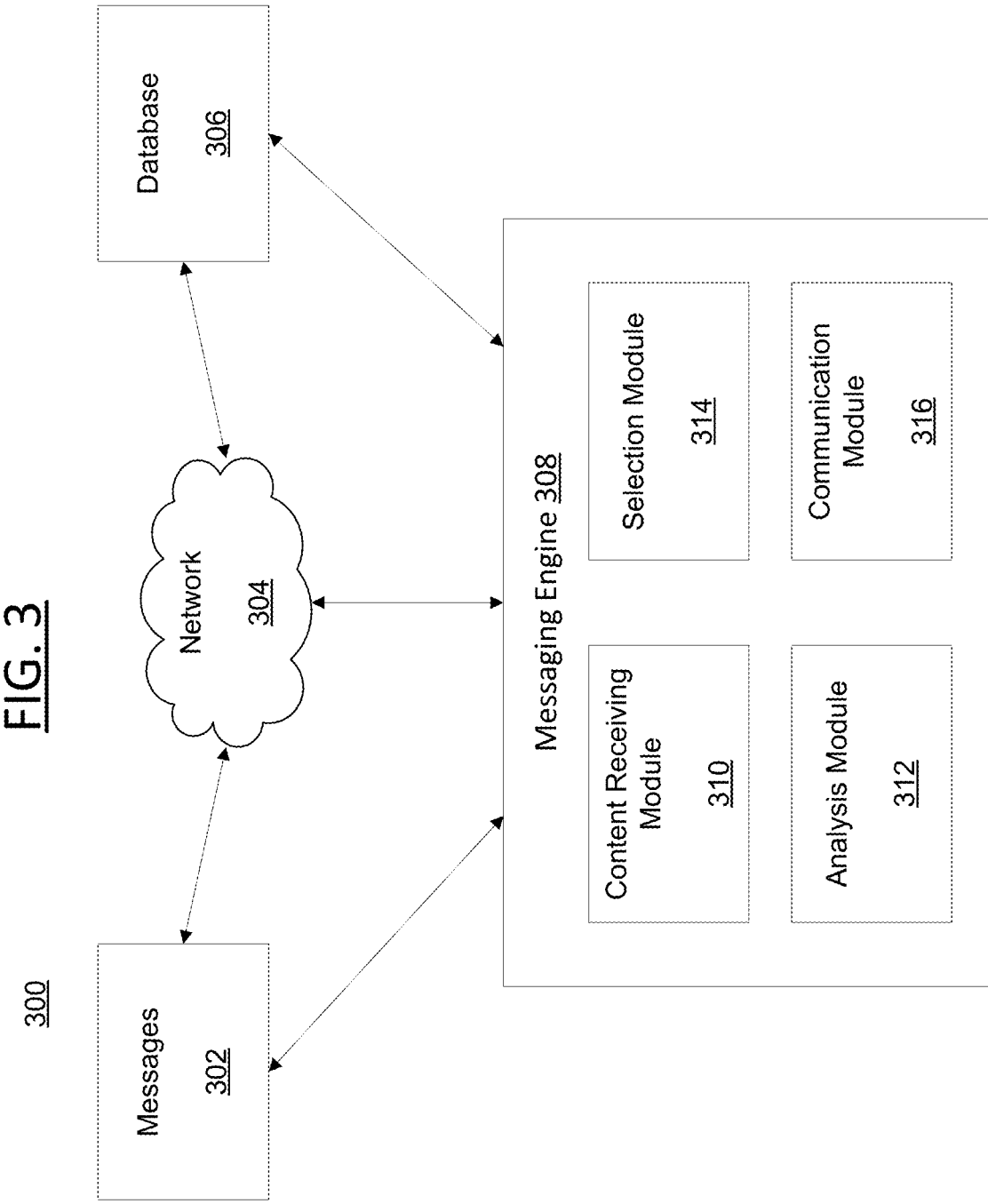
FIG. 3 is a schematic block diagram illustrating components of a system in accordance with embodiments of the present disclosure.

FIG. 3 is a block diagram illustrating the components of system 300 for performing the systems and methods discussed herein. FIG. 3 includes a plurality of messages 302, a network 304, a messaging engine 308 and a database 306 for storing messages and/or advertisement content. The messaging engine 308 can be a special purpose machine or processor, and could be hosted by a messaging server, web server, application server, content provider, email service provider, ad server, a user's computing device, or any combination thereof.

The plurality of messages 302 can be any type of message. Examples of such messages 302 can include email messages, HTML forms SMS/MMS messages, Skype® messages, Twitter® messages and other social messages, comments to an article or website, online forum posts/entries, word processing documents, help desk messages, portable document format (PDF) documents and/or other types of documents. The messages 302 can be generated by the messaging engine 308, provided to the messaging engine 308 or accessed by a computer program or device that can access the messages. In some embodiments, the messages 302 can be stored in a database 306 of stored messages, which can be associated with an email provider, such as Yahoo! Mail®. The database 306 can be any type of database or memory that can store the messages 302, user profile information, ad content (data and metadata), and the like.

For purposes of the present disclosure, email messages as a whole are discussed within some embodiments; however, it should not be construed to limit the applications of the systems and methods discussed herein. Indeed, while reference is made throughout the instant disclosure to email messages, other forms of electronic documents or transmissions (e.g., Short Message Service (SMS) messages, Multimedia Message Service (MMS) messages, and the like) can be generated, communicated and/or accessed and processed by the messaging engine 308 according to the systems and methods discussed herein.

The database 306 can be any type of database or memory, and can be associated with a server on a network which is providing messages 302, or other types of content or associated and/or affiliated content (e.g., content server 106, application server 108, ad server 130, and the like). Database 306 comprises a dataset of information associated with user data and associated user metadata, message content associated with messages 302, ad content provided by ad server 130, or other types of messages delivered to a user's inbox, and the like. Such information can be stored in the database 306 independently and/or as a linked or associated dataset when such information is received, identified, generated and/or delivered to a user, as discussed in more detail below.

According to some embodiments, user data can include, but is not limited to, information associated with a user's profile, user interests, user behavioral information, user attributes, user preferences, user demographic information, user location information (e.g., geographic information), user biographic information, and the like, or some combination thereof.

As discussed above, with reference to FIG. 1, the network 304 can be any type of network such as, but not limited to, a wireless network, a local area network (LAN), wide area network (WAN), the Internet, or a combination thereof. The network 304 facilitates connectivity between the messages 302, the messaging engine 308, and the database of stored resources 306. Indeed, as illustrated in FIG. 3, the messaging engine 308, messages 302 and database 306 can be directly connected by any known or to be known method of connecting and/or enabling communication between such devices, hosting platforms, engines and resources, and the like.

The principal processor, server, or combination of devices that comprises hardware programmed in accordance with the special purpose functions herein, referred to for convenience as messaging engine 308, includes content receiving module 310, analysis module 312, selection module 314 and communication module 316. It should be understood that the engine(s) and modules discussed herein are non-exhaustive, as additional or fewer engines and/or modules may be applicable to the embodiments of the systems and methods discussed. The operations, configurations and functionalities of each module, and their role within embodiments of the present disclosure will be discussed with reference to FIGS. 4-5C.

Figure 4:
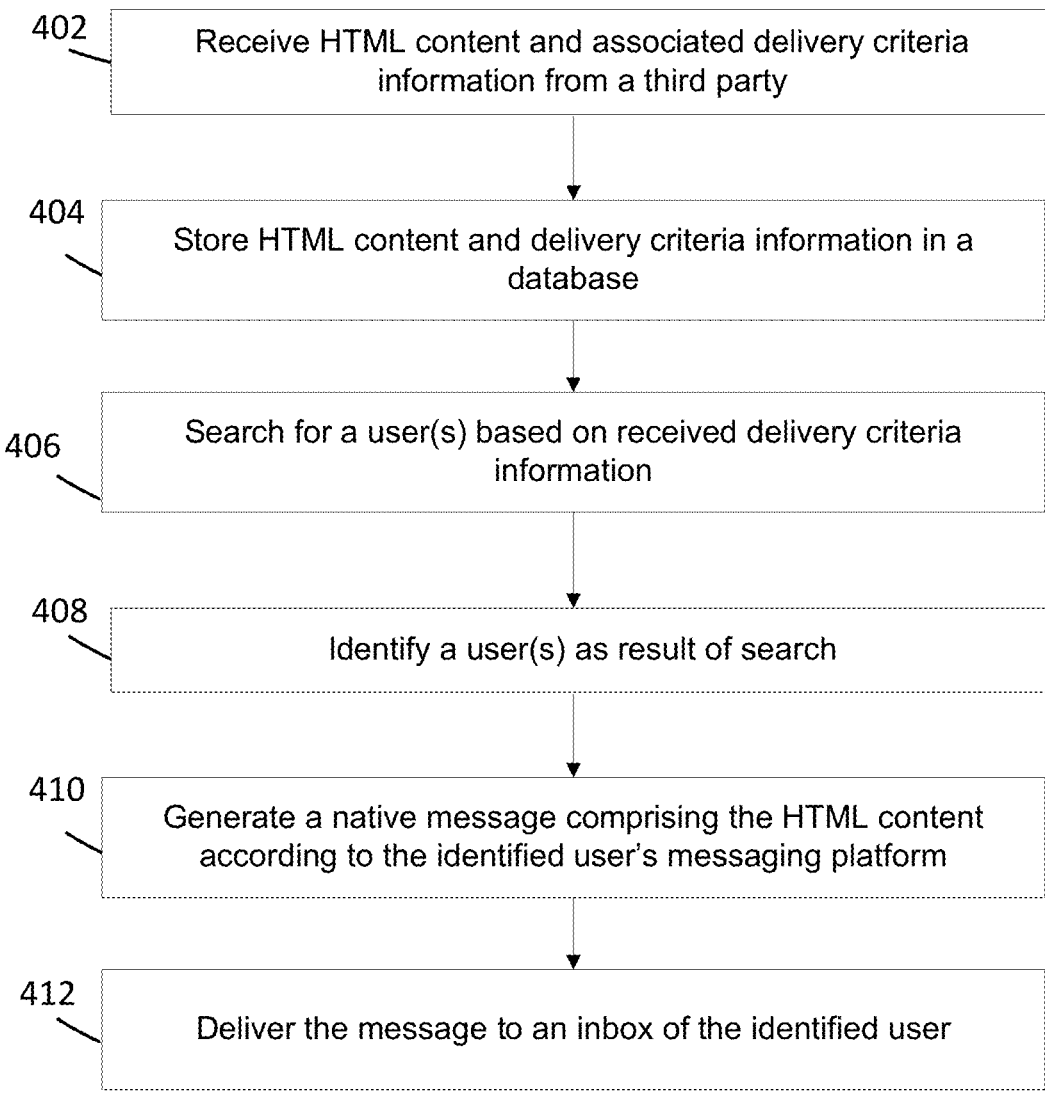
FIG. 4 is a flowchart illustrating steps performed in accordance with some embodiments of the present disclosure.

FIG. 4 is a process 400 diagram illustrating steps performed in accordance with embodiments of the present disclosure for delivering third party provided HTML content within a dedicated, native message to the user's inbox. Process 400 discusses how the messaging engine 308 selects, for example, HTML content provided by a third party, identifies a user having data, attributes or preferences that indicate the user would be interested in the HTML content, and generates a native email message comprising the HTML content that is delivered to the user's inbox. As discussed herein, the generated and delivered email message is displayed as a normal native email message would be in the user's inbox.

For example, FIG. 5A illustrates a user's inbox 500, which is displays a message listing 502 (or message pane) of messages the user has received. A generated native ad content message 504 is received in user inbox 500 and displayed in message listing 502 within the inbox 500. As illustrated, the message 504 is "sponsored" by the advertiser 504a: "CompareCards.com", and the ad content is associated with, as indicated in the title 504b of the message 504 "Credits Cards Are Now Offering 0% APR Through 2017", which is the subject line of the message. Items 504a, 504b (and discussed below 504c) can be derived and/or determined from the HTML code of the ad content (and in some embodiments, can be derived from associated metadata of the ad content provided by the third party, CompareCards.com). In some embodiments, the displayed message 504 in the user inbox 500 will indicate the message as being a product of "sponsored" content, as discussed herein and illustrated in FIG. 5A, and in some embodiments, no such indication will appear.

According to some embodiments, the disclosed message/marketing systems and methods discussed herein can be per user or an aggregate of users. For purposes of this disclosure, the focus will be on serving ad content messages and/or content to a single user; however, it should not be construed as limiting, as the systems and methods discussed herein are applicable to a plurality or group of users, as Process 400 is applicable to not only a plurality of users and third parties analyzed individually, but also to a plurality of users and third parties analyzed as an aggregate.

For purposes of the discussion of FIG. 4, as discussed herein, the steps will be performed in accordance with a message platform, e.g., Yahoo!® Mail; however, as discussed above, it should not be construed to limit the scope of the disclosed systems and methods to solely a messaging platform, as any type of known or to be known content hosting and/or delivery platform can be utilized for performing Process 400 without departing from the scope of the instant disclosure. Indeed, the disclosed systems and methods can be performed within and/or across any known or to be known messaging and/or marketing platform, application, service, system, and the like, as understood by those of skill in the art.

Furthermore, in some embodiments, the disclosed systems and methods can be performed from (or within) a single message platform, e.g., Yahoo! Mail®; and in some embodiments, the across multiple platforms, such as Yahoo! Mail®, Google Mail®, Hotmail®, and other personal and business email platforms, such as Microsoft Outlook®, and the like, as well as social networking platforms, such as Tumblr®, Facebook® and Twitter® and the like. In some embodiments, at least some steps performed in Process 400 of FIG. 4 can be performed offline and/or online, as discussed in more detail below.

Process 400 beings within Step 402 where HTML content is communicated from a third party along with delivery criteria information (e.g., targeting information) to a messaging platform (e.g., Yahoo!® Mail). Such communication can involve the messaging platform accessing a database of the third party, and saving, copying and/or retrieving such HTML content. Such communication can also involve the third party providing the messaging platform with such HTML content, where the HTML content can be communicated in response to a request for such content. Step 402 is performed by the content receiving module 310 of the messaging engine 308.

According to some embodiments, as discussed above, the content being discussed herein refers to rich HTML content that is formatted with at least one destination link associated therewith. According to some embodiments, the content comprises HTML code (or elements or other types of American Standard Code for Information Interchange (ASCII) characters and/or symbols) for embedding and/or displaying content (e.g., text, video, audio and/or images) within a message, as discussed herein. In some embodiments, the HTML code can indicate the destination link or links (e.g., URLs and/or URIs to external resources (e.g., websites, applications, and the like). Thus, in some embodiments, the content received from the third party comprises any type of known or to be known content that is associated with HTML code or elements that can be input, embedded and/or otherwise displayed within a message communicated or otherwise delivered to a user. Indeed, such HTML content comprises information indicating how such content is to be displayed in such messages, in addition to how such content responds to user and/or computer interactions. The use of HTML content provides advertisers with the ability to simply "cut and paste" ad content from another campaign for use in the disclosed system herein without further formatting or editing by the ad provider or the email system receiving the ad.

The delivery criteria information (also referred to as delivery information or targeting information) comprises a description of conditions, that upon satisfaction, the content is to be communicated to a user. Such description can be associated with a user's age, gender, demographics, geographical information, attributes, preferences, or other types of profile data, as well as technographic information associated with a user associated with a user's usage/behavioral patterns, and the like, and/or any other type of information associated with a user and/or conditions for communicating content to a user. As such, as discussed in more detail below, upon a user being determined to match the delivery criteria information associated with received content, the identified user can then be served the content.

In some embodiments, the delivery criteria information can be separate information, an identifier or set of identifiers, or data that accompanies and/or is associated with the HTML content. In some embodiments, the delivery criteria information can be part of the HTML code (as an element or identifier, or set thereof, within the code). In some embodiments, the delivery criteria information can be metadata associated with the HTML content.

In Step 404, the received HTML content and delivery criteria information are stored in a database as an associated data set. In some embodiments, the database can be associated with, in connection with or hosted as part of the same messaging platform as the messaging engine 308 (as discussed above in relation to FIG. 3), or hosted by a separate or remote server/device platform. Step 404 is performed by the content receiving module 310.

In Step 406, identification of a user is performed to determine which received content (from Steps 402-404) is to be communicated to which user as a native message. Step 406 is performed by the analysis module 312. In some embodiments, Step 406's identification of a user and content is triggered by a request for information associated with users matching at least a portion of delivery criteria information associated with stored content. In some embodiments, such request may be a network call to associated servers or databases, such as, for example, a call to an associated, affiliated and/or independent content (e.g. ad) platform. In some embodiments, the request of Step 406 may be triggered by the third party (e.g., advertiser) sending a request to the messaging platform to serve an advertisement associated with the third party.

According to some embodiments, Step 406 can involve analyzing an ad platform (such as an associated ad platform with, or within the messaging platform) to identify specific advertisers. In some embodiments, this can involve parsing section identifiers associated with advertisers (i.e., third parties) within such platform(s) to identify a creative identifier (ID) of an advertiser. In some embodiments, the creative ID can be utilized to identify stored content and delivery criteria information, either from a datastore location associated/affiliated with the messaging platform, or from a remote location associated with the third party (or advertiser). That is, as discussed above, the database can be associated with, in connection with or hosted as part of the same messaging platform, or hosted by a separate and/or remote platform. Therefore, in some embodiments, the creative ID can be utilized to locate (via a connected system) received and stored content and/or delivery criteria information (from Steps 402-404) for purposes of searching for a user (Step 406). In some embodiments, the creative ID can be utilized to identify and communicate, from a separate/remote platform, the content and/or delivery criteria information for purposes of searching for a user (Step 406).

In some embodiments, the request of Step 406 may be sent based on a marketing campaign, contract, license or other type of agreement between the provider associated with the messaging platform (e.g., Yahoo!®) and a third party, which dictates how, when, where and/or why certain content is to be delivered to users of the messaging platform. In some embodiments, such agreement(s) can be identifiable by a creative ID, which dictates which advertisers (i.e., third parties) are to be serviced by facilitating their content to users.

Therefore, Step 406 involves any of the above embodiments, or combinations thereof, for performing a search request to identify at least one user having user data associated with delivery criteria information of stored HTML content.

In some embodiments, Step 406 can comprise a search request where the delivery criteria information associated with stored content forms at least a portion of the search query. In some embodiments, Step 406 may comprise analyzing and/or mining for user data in accordance with the delivery criteria information. It should be understood that the analysis and/or mining occurring in Step 406 can be performed in accordance with any known or to be known data mining, pattern recognition, machine learning or knowledge discovery in databases (KDD) algorithms, techniques or technology, such as but not limited to, deep learning networks (e.g., artificial neural networks, convolutional networks and deep neural networks, and the like, Sparse Factor Analysis (SFA), Hidden Markov Models (HMMs), Support Vector Machines (SVMs), Bayesian Methods, and the like.

In Step 408, a user having user data associated with at least a portion of the delivery criteria information is identified. Step 408 is performed by the selection module 314. The identification of a user based on the user data can include a user's user data matching at least a portion of the delivery criteria information at or above a threshold. Thus, Step 408 involves selecting a user from a plurality of users (having messaging accounts, for example) based on that user having user data satisfying a threshold amount of the searched delivery criteria information.

According to some embodiments, the search (and/or analysis) and identification of Steps 406-408 is performed in accordance with user data stored in a database, which is accessible upon request for content delivery purposes including, but not limited to, delivering messages (e.g., email) to users, and/or delivering third party content as native messages, as discussed herein. As discussed above, user data, which can be hosted by the messaging platform or accessible to it, for example, can include, but is not limited to, information associated with a user's profile, user interests, user behavioral information, user attributes, user preferences, user demographic information, user location information (e.g., geographic information), user biographic information, and the like, or some combination thereof, which can be compared against the ad delivery criteria.

By way of a non-limiting example, Yahoo!® Mail's server may perform a request call to an associated database for user information based on stored third party data. In this example, the database is an associated Yahoo!® database that not only stores user information for all Yahoo!® Mail users, but also stores the received third party content and delivery criteria information (from Steps 402-404). However, such configuration should not be construed to limit the scope of the instant disclosure's network configurations between content hosting, providing and communicating servers and databases.

Continuing with the example, the request comprises criteria information associated with identifying users, for example, being between the ages of 30-40 and living in Los Angeles, Calif. The demographic information: 30-40 year olds living in Los Angeles, Calif. is identified, determined, derived or otherwise learned from the delivery criteria information associated with previously received content. For example, such information may be provided as a set of identifiers within HTML code (or metadata associated with such code) received in Step 402. (In this example, the content is associated with Lakers tickets.) Therefore, in accordance with Steps 406-408, a search is performed (either via a search query or some type of analysis/mining algorithm) that identifies a user, Bill, that lives in Los Angeles, Calif., who is between the age of 30-40.

Turning back to Process 400, after identifying a user that matches the delivery criteria information, a message native to the user's messaging platform is generated (or created or drafted), which is addressed to the user's inbox and includes the content provided by the third party. Step 410, which is performed by the communication module 316. The native message comprises a message header and message body, which can be formatted, modified, filled/populated based on the instructions within the HTML content/code. Therefore, according to some embodiments, the message is comprised of (received and stored) third party provided HTML content. As discussed above, the third party content is rich, HTML content which would enable the received user to interact with the content, thereby enabling a type of user engagement that does not currently exist in serving ads to users.

In some embodiments, Step 410 involves retrieving (or receiving) from storage the HTML content associated with the delivery criteria information that formed the request/call/search from Step 406. Such retrieving/receiving can be based on a search that is based on the delivery criteria information used to identify the user from Steps 406-408. Indeed, in some embodiments, the retrieval, accessing and/or identifying of the HTML content can be performed in accordance with a creative ID, in a similar manner discussed above in Step 406 for identifying stored third party content and delivery criteria information (whether stored in an associated datastore or remote datastore).

In some embodiments, Step 410's generation of the message comprises generating the message according to the configuration settings associated with a typical message received from, at or by the messaging platform. In some embodiments, the configuration of the message as a native message can involve having the message created to comply with a specific messaging platform, e.g., Yahoo!® Mail, or according to currently known and followed (as well as to be known and followed) Internet e-mail standards and functions, set by the Internet Engineering Task Force (IETF), which requires virtually all mail servers and e-mail clients to support at least a basic set of protocol (e.g., Simple Mail Transfer Protocol (SMTP)) by which email is transmitted, email is formatted, the way email formats/supplements all header and body types, and mechanisms for retrieving messages by any type of email client and/or application). Thus, in some embodiments, the generated message may be configured and/or modified to conform to attributes of the page or inbox upon which the message will be displayed, and/or the device and/or application upon which it will be displayed.

In some embodiments, when the disclosed Process 400 is being performed across messaging platforms, Step 410 can involve determining, from the user data associated with the identified user (from Step 408), which messaging platform is associated with the user, and generating the native message according to such platform.

In some embodiments, as discussed above, and below in reference to FIGS. 5A-5C, a message's sender can be set to be (in the message header) the third party that generated, promotes or otherwise provided the messaging platform the content (in Step 402); and, in some embodiments, such identification can be derived and/or determined from the HTML content (code). It should be understood that any information typically associated with a message received at a messaging platform can be derived, identified and/or determined from the received (HTML) content from Step 402, as discussed below.

In Step 412, the message is delivered to the identified user's inbox. Such delivery, which is performed by the communication module 316, involves having the message displayed in the identified user's inbox as any other type of message would be in the user's inbox. Thus, Step 412 involves delivering the generated native message from Step 410 to the identified user in Steps 406-408, where the native message comprises content received in Step 402 and stored in Step 406.

According to some embodiments, when a message is opened, as illustrated in FIGS. 5B-5C (after delivery in Step 412, as illustrated in FIG. 5A), the HTML content is rendered within the displayed body of the message. That is, a message 504 can comprise HTML content 504c (in FIG. 5B) that has at least one destination link associated therewith; or a message 504 can comprise multiple HTML content 508-510, where each HTML content ad (508-510) can be associated with at least one destination link. Thus, in some embodiments, interactions with such HTML content, such as clicking on the HTML content (504c, 508, 510), can enable the user to be directed to a webpage, application, network destination or other display window that provides additional, further or a type of re-displayed HTML content. Such redirection/destination webpages or other display destinations can be hosted by the third party, which can increase monetization opportunities for the third party, as discussed below.

Continuing with the Lakers example above, for clarity of explanation of Process 400, user Bill is identified to satisfy the delivery criteria information. Thus, as in Step 410, an email message is created, and includes content associated with Lakers tickets. The email message satisfies at least the current email standards; and in some embodiments, the generated email message is configured to comply with the standards for communicating emails via the Yahoo!® Mail platform, which in some embodiments may or not be the same as the basic requirements set by the IETF. Additionally, the created message has header information that indicates that the message is from a third party, e.g., the LA Lakers® or NBA®. As in Step 412, the message is then displayed in the user's inbox as a native message, where the user can interact HTML content associated with Laker tickets displayed in the message body upon opening the message, as well as interact with the message as a whole in any manner similar to other received, sent or otherwise displayed messages in the user's inbox, as supported by the message platform.

Thus, the disclosed systems and methods detailed in Process 400 enable the delivery of relevant, promotional HTML content to a user's inbox within a native message(s) to such inbox. A user performing an action on a received message (such as, for example, opening the message, forwarding, replying and the like) enables the increase of valuable impressions of online media. For example, opening a message can register as a click-through, thereby increasing monetization of the third party promoted content through higher click-through-rates (CTRs) and increased return-on-investment (ROI), revenues, salience and relevance of the served content/online media. According to some embodiments, the disclosed systems and methods for delivering third party content to a user as a native message may be enable the hosting provider, for example, Yahoo!®, to charge a higher premium for enabling third parties to serve content (e.g. ads) on their system/platform.

By way of another non-limiting example, in accordance with non-limiting example FIGS. 5A-5C, user John Smith has an account with Yahoo!® Mail. John is a 25 year old male living in New York, N.Y., and from John's user data (e.g., behavioral activity), it can be determined that John just applied for a credit card online. When the mail server/engine for Yahoo!® Mail performs an ad call, for example, a determination can be made that advertiser provided content matches John's interests. For example, the company CompareCards.com is marketing "0% APR" for certain credit cards to users ages 20-30 in New York City (i.e., delivery criteria information), and upon the mail server/engine making the ad call based on such information, a determination is made matching John's interest in to the promoted deal being offered by CompareCards.com. As such, the mail server selects the promoted content (from an associated ad/content database) and generates a Yahoo!® Mail message which includes such content. This message 504, which is native to Yahoo!® Mail, is delivered to John's inbox 500 as a separate email (as illustrated in FIG. 5A). Thus, John can open the message 504 to view the rich, HTML content 504c (as illustrated in FIG. 5B) or the rich HTML content 508-510 (as illustrated in FIG. 5C).

For example, as illustrated in FIG. 5B, message 504 (from FIG. 5A) is opened in inbox 500, which displays only the promoted HTML content 504c, as the message 504 is a native message generated by the messaging/mail server/engine based, in some embodiments, solely on promoted third party content. As in the example illustrated in FIG. 5B, message 504 comprises HTML content 504c which details the credit card deal offered by CompareCards.com and has associated therewith, for example, multiple destination URLs (506a, 506b and 506c) that can take the user to network locations associated with the advertiser or ad content. For example, link 506a, associated with "CompareCards.com" can take the user, upon clicking on item 506a, to the CompareCards.com website; link 506b, associated with the text "Credit Cards Are Now Offering 0% APR Through 2017" can take a user, upon clicking on item 506b, to a web page associated with the advertised deal; and link 506c associated with the image of the woman holding credit cards can take a user, upon clicking on item 506c, to another webpage/website that has information about the deal, or for example, a web page that compares the credit cards associated with the "0% APR" offer.

In another non-limiting example, as illustrated in FIG. 5C, message 504 is opened in inbox 500, which displays promotional HTML content 508-510. It should be understood that the example of FIG. 5B is not limited to only two types of HTML content, as a plurality of HTML content can be illustrated, in any manner, and such HTML content can be any type of known or to be known HTML content (as discussed above in relation to HTML content in general and HTML content 504c). Thus, message 504 can comprise a plurality of HTML content 508-510 (e.g., HTML content items), where each HTML content can be associated with at least one destination (or target) network location (e.g., URL).

In some embodiments, the title 504b of the message can also be displayed, as illustrated in FIGS. 5B-5C. Indeed, in some embodiments, any other type of information associated with an opened message can be displayed, such as, for example, information associated with the sender (here, the party/entity associated with the promoted content: CompareCards.com 504a). According to embodiments of the present disclosure, as discussed above, John can also perform any function available on the Yahoo!® Mail platform on message 504, HTML content 504c, 508, 510, and the like, that can be performed on other email messages, whether the message is being acted upon in an opened state or from the inbox of the user's messaging platform. Therefore, for example as discussed above, a third party: CompareCards.com—can have targeted content sent to users without knowing the users' email address (or other identifying information).

Figure 6:
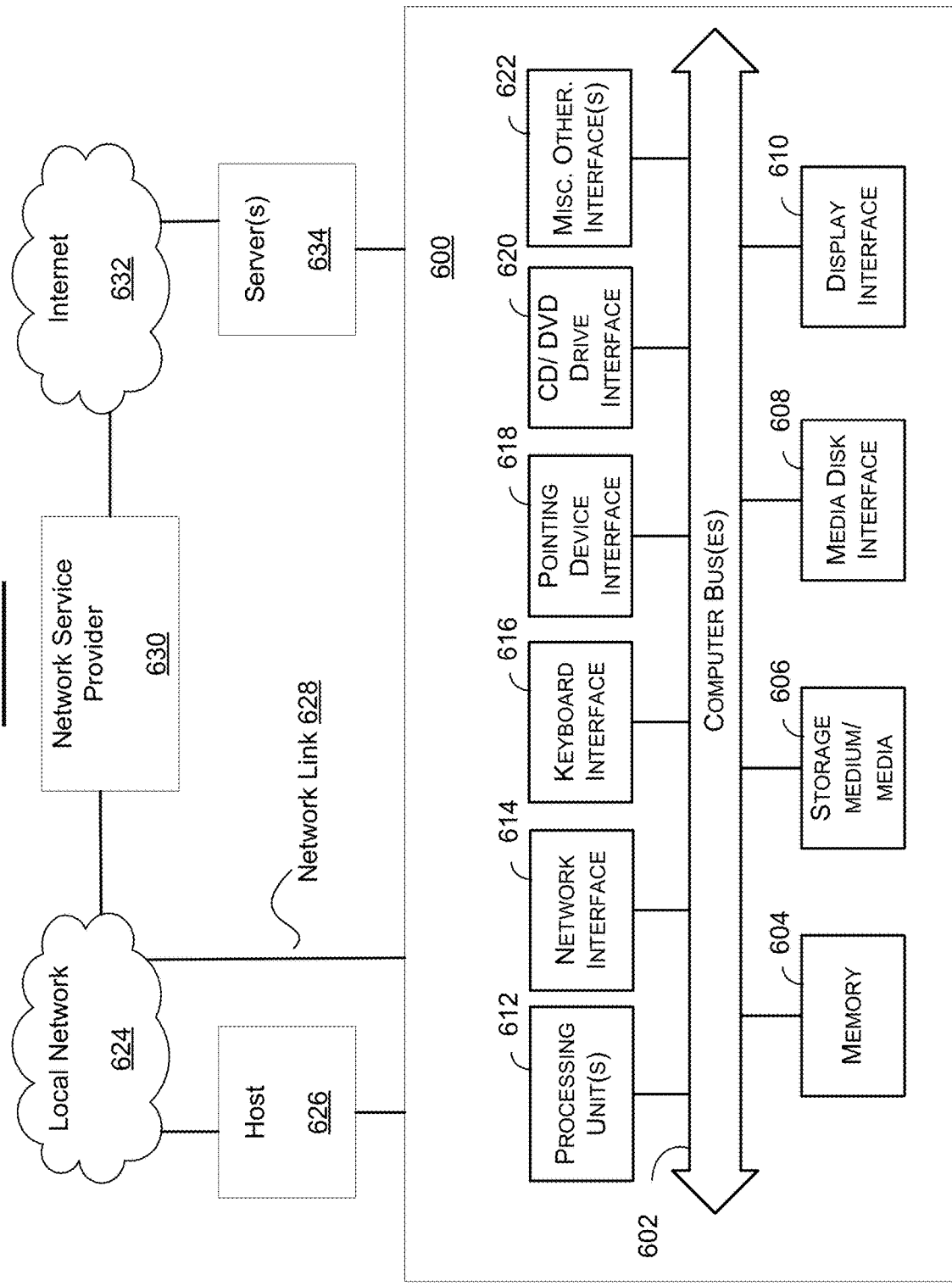
FIG. 6 is a block diagram illustrating architecture of a hardware device in accordance with one or more embodiments of the present disclosure.

As shown in FIG. 6, internal architecture 600 includes one or more processing units, processors, or processing cores, (also referred to herein as CPUs) 612, which interface with at least one computer bus 602. Also interfacing with computer bus 602 are computer-readable medium, or media, 605, network interface 614, memory 604, e.g., random access memory (RAM), run-time transient memory, read only memory (ROM), media disk drive interface 620 as an interface for a drive that can read and/or write to media including removable media such as floppy, CD-ROM, DVD, media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces and a universal serial bus (USB) interface.

Memory 604 interfaces with computer bus 602 so as to provide information stored in memory 604 to CPU 612 during execution of software programs such as an operating system, application programs, device drivers, and software modules that comprise program code, and/or computer executable process steps, incorporating functionality described herein, e.g., one or more of process flows described herein. CPU 612 first loads computer executable process steps from storage, e.g., memory 604, computer readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 628 typically provides information communication using transmission media through one or more networks to other devices that use or process the information. For example, network link 628 may provide a connection through local network 624 to a host computer 626 or to equipment operated by a Network or Internet Service Provider (ISP) 630. ISP equipment in turn provides data communication services through the public, worldwide packet-switching communication network of networks now commonly referred to as the Internet 632.

A computer called a server host 634 connected to the Internet 632 hosts a process that provides a service in response to information received over the Internet 632. For example, server host 634 hosts a process that provides information representing video data for presentation at display 610. It is contemplated that the components of system 600 can be deployed in various configurations within other computer systems, e.g., host and server.

At least some embodiments of the present disclosure are related to the use of computer system 600 for implementing some or all of the techniques described herein. According to one embodiment, those techniques are performed by computer system 600 in response to processing unit 612 executing one or more sequences of one or more processor instructions contained in memory 604. Such instructions, also called computer instructions, software and program code, may be read into memory 604 from another computer-readable medium 606 such as storage device or network link. Execution of the sequences of instructions contained in memory 604 causes processing unit 612 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 600. Computer system 600 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 602 as it is received, or may be stored in memory 604 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, at a computing device associated with a messaging platform, Hypertext Markup Language (HTML) content and delivery condition information from a third party, said delivery condition information comprising at least one condition controlling when said HTML content is communicated via the messaging platform to a later determined recipient;
   storing, via the computing device, said HTML content and delivery condition information in a database in communication with the messaging platform;
   receiving, at the computing device, a request from the third party to identify at least one user having information matching said delivery condition information;
   identifying, via the computing device, based on said request, a user having information within a messaging account with said messaging platform corresponding to said delivery condition information;
   determining, via the computing device, configuration settings of an inbox of the user;
   automatically creating, via the computing device, upon identifying the user in response to said request from the third party, a native message addressed to the inbox of the identified user, said message comprising the HTML content provided by the third party, said creation of the native message comprising formatting the message according to the configuration settings of the inbox; and
   communicating, via the computing device and over a network, said native message to said inbox of the identified user.

2. The method of claim 1, wherein said HTML content comprises rich, interactive HTML content that is formatted with multiple network destinations set by the third party, said formatting comprising embedding a Uniform Resource Locator (URL) for each network destination in said HTML content.

3. The method of claim 1, further comprising:
   causing display of the native message as an opened message in response to receiving input from a user to open said message from the display of the message in said inbox, said opened display comprising the HTML content from said third party within a body of the opened message.

4. The method of claim 1, wherein said identifying the user comprises:
   searching stored user data associated with the messaging platform for user data matching at least a portion of said delivery condition information;
   determining said user to have user data associated with at least a portion of said delivery condition information at or above a threshold; and
   selecting said user based on said determination.

5. The method of claim 1, the native message display enables the messaging platform to handle the native message as any other message received at the inbox.

6. The method of claim 1, wherein said identified user has said messaging account with a second messaging platform, said second messaging platform being different from said messaging platform, wherein said native message is native to said second message platform.

7. The method of claim 1, wherein said creating the native message comprises:
   identifying, from said database, said HTML content based on said delivery condition information used to identify said user, wherein said generated message comprises the identified HTML content.

8. The method of claim 1, wherein said at least one condition of said delivery condition information comprises user data selected from a group consisting of: profile information, age, gender, demographics, geographical information, attributes, preferences, and technographic information.

9. The method of claim 1, wherein said identification of said user is based on a request by said third party, said third party request only comprising instructions to search for users to serve said HTML content based on the delivery condition information.

10. The method of claim 1, further comprising analyzing said HTML content to identify said third party, wherein said native message comprises sender information indicating the third party as the sender.

11. The method of claim 1, wherein said HTML content is an advertisement.

12. The method of claim 1, wherein said third party is an advertiser.

13. A non-transitory computer-readable storage medium tangibly encoded with computer-executable instructions, that when executed by a processor associated with a computing device, perform a method comprising:
   receiving, over a network at a messaging platform, Hypertext Markup Language (HTML) content and delivery condition information from a third party, said delivery condition information comprising at least one condition controlling when said HTML content is communicated via the messaging platform to a later determined recipient;
   storing said HTML content and delivery condition information in a database in communication with the messaging platform;
   receiving a request from the third party to identify at least one user having information matching said delivery condition information;
   identifying, based on said request, a user having information within a messaging account with said messaging platform corresponding to said delivery condition information;
   determining, via the computing device, configuration settings of an inbox of the user;
   automatically creating, upon identifying the user in response to said request from the third party, a native message addressed to the inbox of the identified user, said message comprising the HTML content provided by the third party, said creation of the native message comprising formatting the message according to the configuration settings of the inbox; and
   communicating, over a network, said native message to said inbox of the identified user.

14. The non-transitory computer-readable storage medium of claim 13, wherein said HTML content comprises rich, interactive HTML content that is formatted with multiple network destinations set by the third party, said formatting comprising embedding a Uniform Resource Locator (URL) for each network destination in said HTML content.

15. The non-transitory computer-readable storage medium of claim 13, further comprising:
   causing display of the native message as an opened message in response to receiving input from a user to open said message from the display of the message in said inbox, said opened display comprising the HTML content from said third party within a body of the opened message.

16. The non-transitory computer-readable storage medium of claim 13, wherein said identifying the user comprises:
   searching stored user data associated with the messaging platform for user data matching at least a portion of said delivery condition information;
   determining said user to have user data associated with at least a portion of said delivery condition information at or above a threshold; and
   selecting said user based on said determination.

17. The non-transitory computer-readable storage medium of claim 13, wherein said creating the native message comprises:
   identifying, from said database, said HTML content based on said delivery condition information used to identify said user, wherein said generated message comprises the identified HTML content.

18. The non-transitory computer-readable storage medium of claim 13, wherein said at least one condition of said delivery condition information comprises user data selected from a group consisting of: profile information, age, gender, demographics, geographical information, attributes, preferences, and technographic information.

19. A system comprising:
   a processor; and
   a non-transitory computer-readable storage medium for tangibly storing thereon program logic for execution by the processor, the program logic comprising:
      logic executed by the processor for receiving, over a network at a messaging platform, Hypertext Markup Language (HTML) content and delivery condition information from a third party, said delivery condition information comprising at least one condition controlling when said HTML content is communicated via the messaging platform to a later determined recipient;
      logic executed by the processor for storing said HTML content and delivery condition information in a database in communication with the messaging platform;
      logic executed by the processor for receiving a request from the third party to identify at least one user having information matching said delivery condition information;
      logic executed by the processor for identifying, based on said request, a user having information within a messaging account with said messaging platform corresponding to said delivery condition information;

logic executed by the processor for determining configuration settings of an inbox of the user;

logic executed by the processor for automatically creating, upon identifying the user in response to said request from the third party, a native message addressed to the inbox of the identified user, said message comprising the HTML content provided by the third party, said creation of the native message comprising formatting the message according to the configuration settings of the inbox; and logic executed by the processor for communicating, over a network, said native message to said inbox of the identified user.

20. The system of claim 19, further comprising:

logic executed by the processor for searching stored user data associated with the messaging platform for user data matching at least a portion of said delivery condition information;

logic executed by the processor for determining said user to have user data associated with at least a portion of said delivery condition information at or above a threshold; and logic executed by the processor for selecting said user based on said determination.

* * * * *